United States Patent
Huang

[11] Patent Number: 5,931,298
[45] Date of Patent: Aug. 3, 1999

[54] STRIP FOR SUPPORTING NAILS

[76] Inventor: Shih Chang Huang, No. 134, Yiau San Street, San Min Chu, Kaoshiung, Taiwan

[21] Appl. No.: 09/018,624

[22] Filed: Feb. 4, 1998

[51] Int. Cl.$^6$ .................................................. B65D 85/24
[52] U.S. Cl. .......................... 206/346; 206/347; 206/820; 411/442
[58] Field of Search ........................... 206/338, 345–347, 206/820; 411/442, 443

[56] References Cited

U.S. PATENT DOCUMENTS

| | | | |
|---|---|---|---|
| 3,944,068 | 3/1976 | Maier et al. | 206/347 |
| 3,955,674 | 5/1976 | Maier et al. | 206/347 |
| 5,509,768 | 4/1996 | Hon | 411/442 |
| 5,522,687 | 6/1996 | Chen | 411/444 |
| 5,544,746 | 8/1996 | Dohi | 206/346 |
| 5,713,709 | 2/1998 | Huang | 206/347 |
| 5,779,420 | 7/1998 | Huang | 206/347 |
| 5,788,445 | 8/1998 | Huang | 206/347 |
| 5,803,691 | 9/1998 | Huang | 206/347 |

*Primary Examiner*—Jim Foster

[57] ABSTRACT

A strip includes a number of holes formed by a number of peripheral walls for engaging with fasteners and includes a number of tapered annular surfaces and shoulders formed between the strip and the peripheral walls. The peripheral walls each includes one or more slits for resiliently supporting the fasteners in place. The slits are each terminated at a coupling portion. The strip includes a number of openings and a number of bulges extended from the tapered annular surfaces for decreasing the contact area between the strip and the fasteners.

6 Claims, 3 Drawing Sheets

STRIP FOR SUPPORTING NAILS

BACKGROUND OF THE INVENTION

1. Field of the Invention

The present invention relates to a strip, and more particularly to a strip for supporting nails.

2. Description of the Prior Art

Typical strips for supporting nails comprise a strip body having a number of holes for engaging with nails. The strips are engaged in a nailing or stapling mechanism for supplying the nails into the nailing mechanism and for allowing the nails to be driven out of the strips. However, the strip will be broken when the nails are punched out of the strip.

The present invention has arisen to mitigate and/or obviate the afore-described disadvantages of the conventional strips.

SUMMARY OF THE INVENTION

The primary objective of the present invention is to provide a strip for preventing the strip body to be broken when the nails are driven out of the strip body.

In accordance with one aspect of the invention, there is provided a strip comprising a strip body including a plurality of holes and including a plurality of peripheral walls dependent downward from the strip body for defining the holes and for engaging with fasteners and for decreasing a contact area between the strip body and the fasteners, the strip body including a plurality of tapered annular surfaces formed between the strip body and the peripheral walls for engaging with the fasteners and for decreasing the contact area between the strip body and the fasteners, the peripheral walls each including at least one slit extended along the peripheral walls for increasing a resilience of the peripheral walls and for allowing the peripheral walls to resiliently support the fasteners in place.

The peripheral walls each includes a coupling portion formed below the slit, the slits are terminated at the coupling portions.

The slits each includes an inclined portion formed in the tapered annular surface and each includes a horizontal portion formed in the shoulder and communicating with the inclined portion.

The strip body includes a plurality of openings communicating with the horizontal portions of the slits for further increasing the resilience of the peripheral walls.

The openings are preferably square in shape.

The strip body includes a plurality of bulges extended from the tapered annular surfaces for engaging with the fasteners and for further decreasing the contact area between the strip body and the fasteners.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

A co-pending U.S. patent application was filed on Apr. 10, 1997, with the Ser. No. 08/843,687. The co-pending U.S. patent application is taken as a reference of the present invention.

Figure 1:
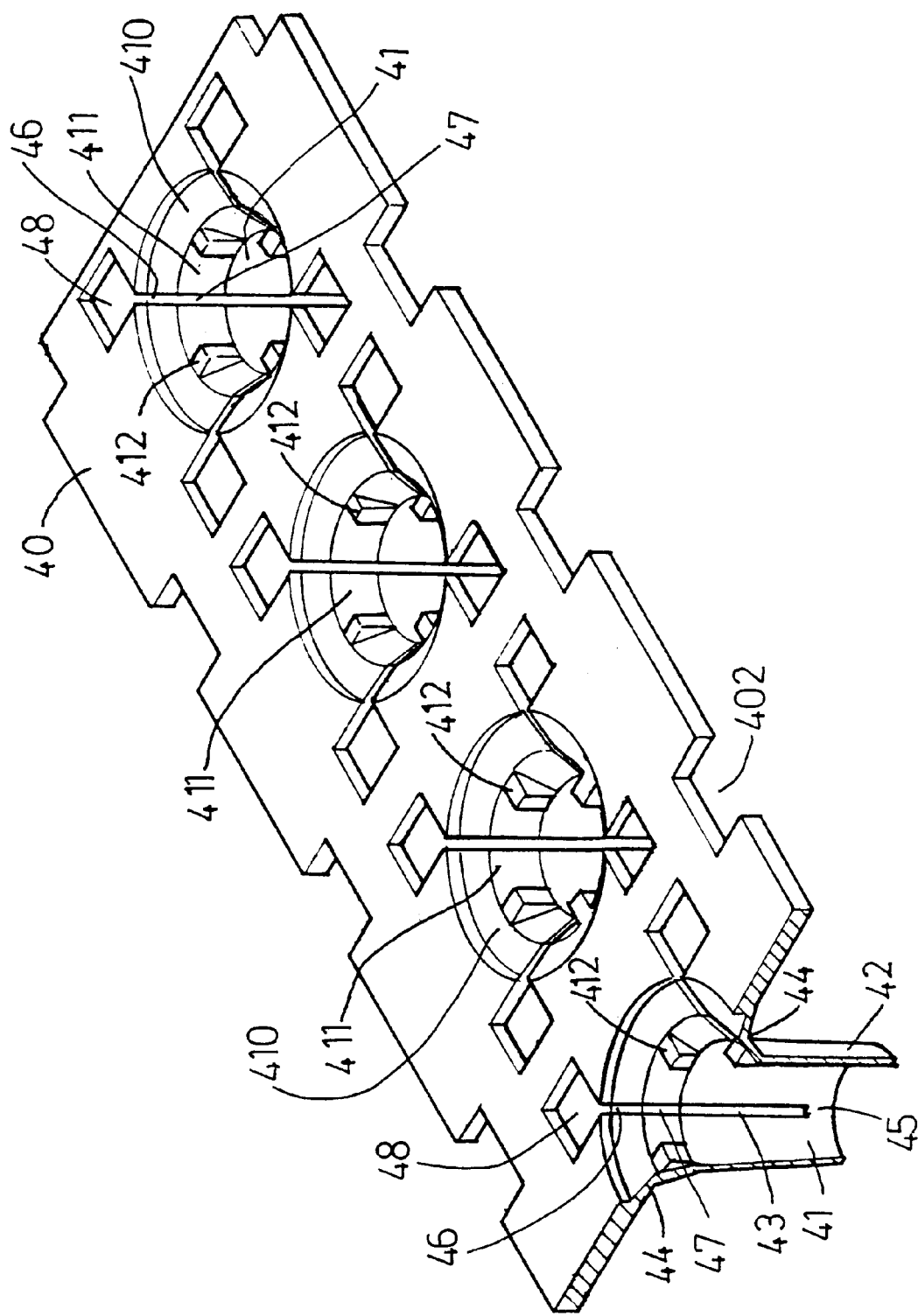
FIG. 1 is a partial perspective view of a strip in accordance with the present invention.
Figure 2:
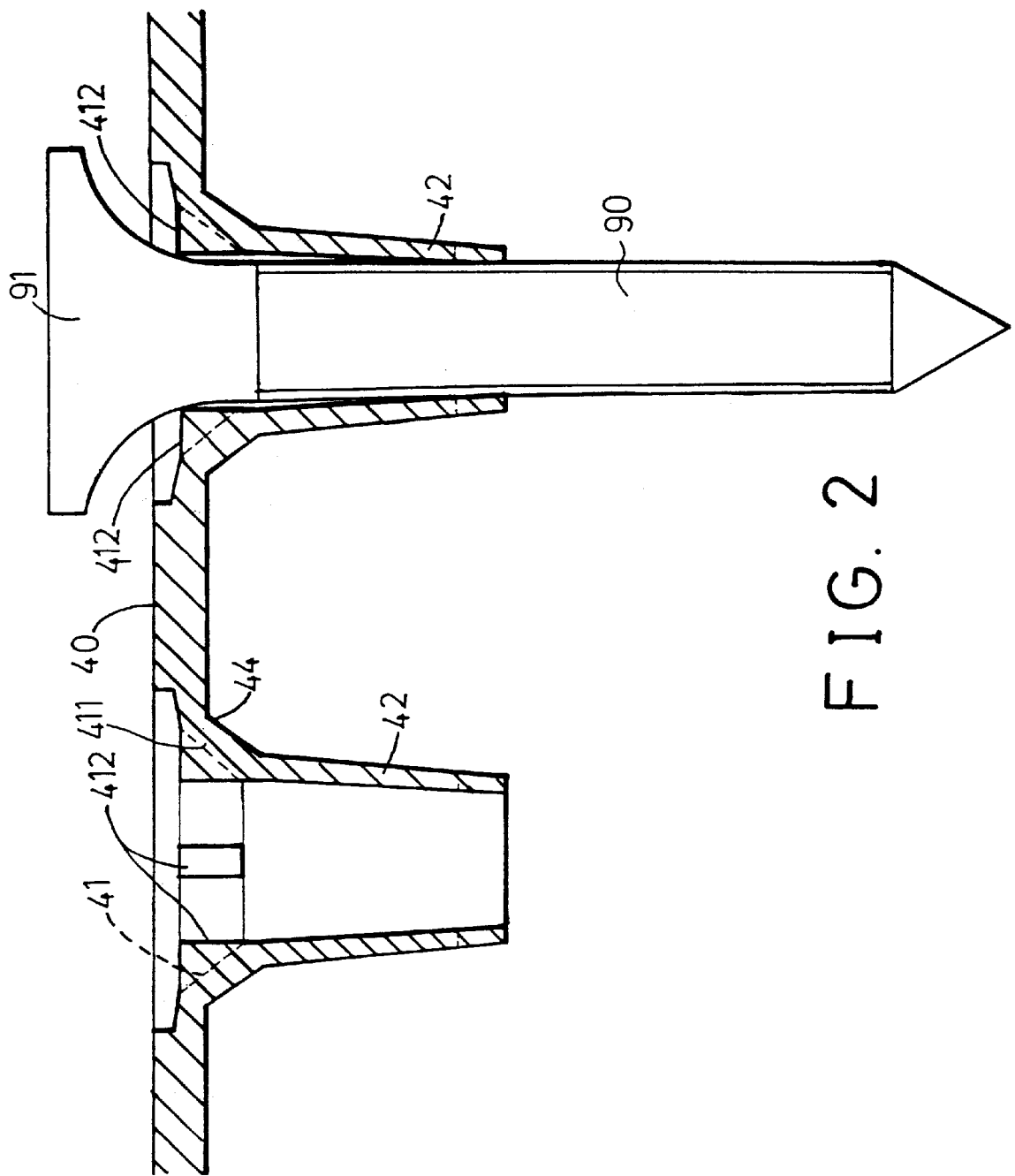
FIG. 2 is a partial cross sectional view of the strip, illustrating the application of the strip.
Figure 3:
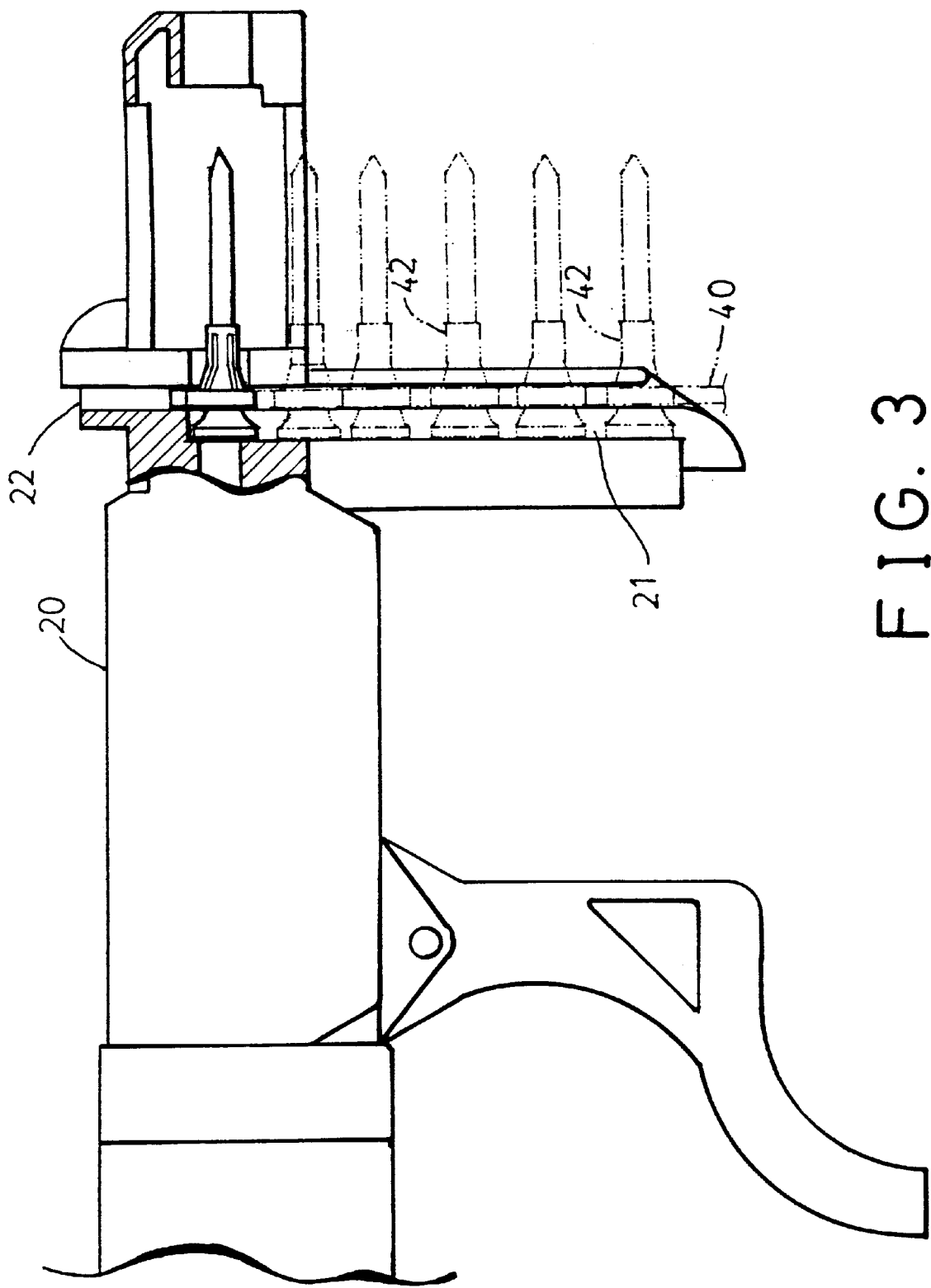
FIG. 3 is a schematic view illustrating the operation of the strip.

Referring to the drawings, and initially to FIGS. 1 and 2, a strip in accordance with the present invention comprises a strip body 40 including two side edges each having a number of notches 402 for engaging with a nailing mechanism and for allowing the strip body 40 to be driven by the nailing mechanism. The strip body 40 includes a number of holes 41 each defined by a peripheral wall 42, such as a cylindrical or frustum shaped peripheral wall, for engaging with fasteners, such as bolts or nails or screws 90, and for decreasing the contact area between the strip body 40 and the fastener 90. The strip body 40 includes a number of shoulders 410 and a number tapered annular surfaces 411 formed between the shoulder 410 and the respective wall 42 for engaging with the cone-shaped head 91 of the fasteners 90 and for decreasing the engaging area between the head 91 and the strip body 40, such that the head 91 can be resiliently supported in place. The walls 42 each includes one or more vertical slits 43 terminating at the coupling portions 45 which are formed in the bottom of the peripheral walls 42 so as to further increase the resilience applied onto the head 91 of the screw 90. The slits 43 each includes a horizontal portion 46 and an inclined portion 47 that are formed in the shoulders 410 and the tapered annular surfaces 411 respectively.

The strip body 40 further includes one or more openings 48 communicating with the horizontal portions 46 and the inclined portions 47 of the slits 43 for further increasing the resilience of the strip body 40 and for allowing the screws 90 to be easily disengaged from the strip body 40. The openings 48 may be square in shape (FIG. 1) or circular or other shapes. The strip body 40 may further include a number of bulges 412 extended from the tapered annular surfaces 411 for engaging with the head 91 of the fastener 90 (FIG. 2). The slits 43 may be slightly inclined or vertical. The fastener 90 may be resiliently secured and supported in the wall 42 which may be suitably bent or expanded for allowing the fastener 90 to be easily disengaged from the wall 42 when the fasteners 90 are sent into a driving mechanism 20 by the strip body 40. The coupling portions 45 may be broken while the fastener 90 is punched through the wall 42.

Accordingly, the strip in accordance with the present invention may resiliently support the fasteners for allowing the fasteners to be easily disengaged from the strip.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A strip comprising:

a strip body including a plurality of holes and including a plurality of peripheral walls dependent downward from said strip body for defining said holes and for engaging with fasteners and for decreasing a contact area between said strip body and the fasteners, said strip body including a plurality of tapered annular surfaces formed between said strip body and said peripheral walls for engaging with the fasteners and for decreasing the contact area between said strip body and the fasteners, said peripheral walls each including at least one slit extended along said peripheral walls for increasing a resilience of said peripheral walls and for allowing said peripheral walls to resiliently support the fasteners in place, and said strip body including a plurality of bulges extended from said tapered annular surfaces for engaging with the fasteners and for decreasing the contact area between said strip body and the fasteners.

2. The strip according to claim 1, wherein said peripheral walls each includes a coupling portion formed below said at least one slit, said slits are terminated at said coupling portions.

3. The strip according to claim 1, wherein said slits each includes an inclined portion formed in said tapered annular surface.

4. The strip according to claim 3, wherein said strip body includes a plurality of shoulders formed between said strip body and said tapered annular surfaces, said slits each includes a horizontal portion formed in said shoulder and communicating with said inclined portion.

5. The strip according to claim 4, wherein said strip body includes a plurality of openings communicating with said horizontal portions of said slits for increasing the resilience of said peripheral walls.

6. The strip according to claim 5, wherein said openings are square in shape.

* * * * *